United States Patent Office 3,642,683
Patented Feb. 15, 1972

3,642,683
POLYMER COMPOSITIONS CONTAINING UNSATURATED POLYESTER, VINYL MONOMER, POLYESTER PLASTICIZER, AND THERMOPLASTIC POLYMER
David Philip Fry, Cardiff, Glamorgan, Wales, assignor to British Resin Products Limited, London, England
No Drawing. Filed Jan. 9, 1969, Ser. No. 790,176
Claims priority, application Great Britain, Jan. 25, 1968, 3,907/68
Int. Cl. C08g 51/68
U.S. Cl. 260—31.6    8 Claims

ABSTRACT OF THE DISCLOSURE

Thermosetting molding compositions based on unsaturated polyester resins containing a saturated liquid polyester and a thermoplastic polymer which is not capable of being plasticized by said liquid polyester, in order to prevent exudation of the liquid polyester when the molding compositions are set by the action of heat.

---

The present invention relates to improvements in thermosetting molding compositions. By a thermosetting molding composition is meant throughout this specification a composition containing as an essential component an unsaturated polyester which composition is normally fabricated into hard infusible shaped articles by the action of heat and pressure, for example, by pressing in a heated mold, or in a heated die as used in an extrusion or injection mold process.

Examples of such thermosetting compositions are dough and crumb mold compositions, preimpregnated mats or other forms of reinforcement in preimpregnated form, matched die compositions based on unsaturated polyester and reinforcement mat of "preform," i.e. preform mold compositions. The present invention as described hereafter is particularly useful with respect to dough mold compositions. By a dough mold composition is meant throughout this specification a composition of a dough consistency which can be molded and which contains as essential component an unsaturated polyester and a monomeric material which is copolymerizable therewith, said composition being capable of being thermoset to a hard product under the influence of heat and pressure, but being sufficiently stable for normal storage of at least several hours and preferably for longer periods. A crumb mold composition is similar to a dough mold composition but in the form of a free flowing solid. Such compositions are described in copending British application No. 13,163/68.

Unsaturated polyesters for use in thermosetting mold compositions, e.g. dough and crumb mold compositions, are well known. Such a polyester is usually a condensation product of a glycol and a mixture of an α,β-unsaturated dibasic acid (for example, maleic or fumaric acid) and a saturated dibasic acid such as phthalic acid, possibly modified by the presence of a small amount of a polyhydric alcohol (for example, pentaerythritol). Examples of suitable copolymerizable monomeric materials are styrene and diallyl phthalate. Such polyesters and suitable monomeric materials are well known and are described, for example, in British Pats. 497,175; 592,046; 540,169 and 656,138. Thermosetting molding compositions usually contain a peroxidic catalyst and an inhibitor such as hydroquinone or tertiary butyl catechol and a proportion of non-reinforcing and reinforcing filler and, if desired, pigments and other conventional additives. The fillers may be glass fiber, asbestos, finely divided minerals such as calcium carbonate or forms of cellulose including sisal or more usually a mixture of such fillers.

One disadvantage of thermosetting molding compositions is that they tend to crack and shrink particularly when used in the production of articles having relatively thick sections.

Thermosetting molding compositions in which the difficulty has been overcome are described in my U.S. Pat. 3,489,707, issued Jan. 13, 1970, and in British patent specification 1,098,132. These disclose a thermosetting molding composition containing a saturated liquid polyester, as hereinafter defined, and sufficient thermoplastic polymer, which polymer is capable of being plasticized by said saturated liquid polyester, to prevent deleterious exudation of saturated polyester during the thermosetting of the molding composition. Examples of such thermoplastics are polyvinyl chloride, butadiene/acrylonitrile copolymers, vinyl chloride/vinyl acetate copolymers, cellulose acetate, chlorinated polyphenyls, polymethyl/methacrylates, polycarbonates, acrylonitrile/styrene/butadiene terpolymers and polystyrenes. The term plasticizer is used throughout U.S. Pat. 3,489,707 and specification No. 1,098,132 in its normal sense according to the nomenclature adopted by the Council of the International Union of Pure and Applied Chemistry on Sept. 15, 1951, i.e. a plasticizer is a substance or material incorporated in a material (usually a plastic or an elastomer) to increase its flexibility, workability, or distensibility.

It has now been found that improved thermosetting molding compositions are still obtained even if the thermoplastic polymer of the compositions according to U.S. Pat. 3,489,707 and British Pat. No. 1,098,132 is replaced by a thermoplastic polymer which is not capable of being plasticized by said saturated liquid polyester.

Accordingly the present invention is a thermosetting molding composition containing a saturated liquid polyester, as hereinafter defined, and sufficient thermoplastic polymer, which is not capable of being plasticized by said saturated liquid polyester, to prevent deleterious exudation of saturated polyester during the thermosetting of the molding composition.

The thermosetting molding compositions according to the present invention may contain the conventional components which have hitherto been used in the production of such compositions. However in addition they contain one or more saturated liquid polyesters and a minor proportion of the above mentioned thermoplastic polymer. By saturated liquid polyester is meant that group of substances which are well known mainly as plasticizers for various thermoplastic resins. The saturated polyesters are liquid, by which is meant that they have a melting point below 30° C. They are prepared by esterifying a polyhydric alcohol with a polybasic acid. Typical examples are the polyesters prepared by the interesterification of, for example, propylene glycol with dibasic acids such as adipic acid and sebacic acid.

The liquid saturated polyesters are suitably present in compositions according to the present invention in proportions from 0.5% to 25% by weight of the total composition. Preferably they are present in the proportions from 2% to 10%.

In the absence of the thermoplastic polymer, saturated liquid polyesters tend to exude from thermosetting molding compositions during the hot molding process by which hard products are obtained therefrom. Surprisingly it is found that the presence of relatively small quantities of the thermoplastic polymer can prevent this liquid polyester exudation. The minimum amount of thermoplastic polymer necessary to prevent exudation can readily be found by experiment. There is normally no advantage in adding more thermoplastic polymer than this minimum amount although greater amounts, e.g. up to 20% by weight of the composition, can be employed without any disadvantageous results. Often suitable quantities of thermoplastic polymer lie in the range 5% to 250% by weight of the quantity of saturated liquid polyester present. The preferred quantity of thermoplastic polymer is about 25% to 100% by weight of the quantity of saturated liquid polyester present.

Examples of useful thermoplastic polymers for use in the practice of this invention are the polyolefines, e.g. polyethylene and polypropylene. The thermoplastic polymer is preferably added to the thermosetting molding composition in a finely divided form, but if desired, and if it is soluble, it can be dissolved in the unsaturated polyester and/or copolymerizable monomer.

The saturated liquid polyester and the thermoplastic polymer can be added to the thermosetting molding composition at any stage in its manufacture. These two essential components can be added separately or together.

The thermosetting molding compositions according to the present invention preferably contain a polymerization initiator to aid the thermosetting of the unsaturated polyester and copolymerizable monomer. Any of the peroxidic initiators which are well known for use with unsaturated polyester resin compositions can be used in compositions according to the present invention.

The preferred unsaturated polyesters for use in the practice of this invention, are those which have a relatively high heat distortion temperature in the thermoset state, so that any reduction of rigidity due to the presence of the saturated polyester is offset. Polyesters with a heat distortion temperature (measured by the Vicat method according to ASTM 648D) greater than 90° C. in the thermoset state are particularly suitable. Examples of such unsaturated polyesters are those in which esterified isophthalic acid or endomethylene tetrahydrophthalic acid residues are present and therefore a preferred embodiment of the invention is a thermosetting molding composition in which the unsaturated polyester present contains said esterified acid residues.

The presence of the saturated liquid polyester in the thermosetting molding compositions of the present invention reduces the shrinkage of the composition on being thermoset. By suitably adjusting the relative and absolute quantities of saturated polyester, unsaturated polyester and copolymerizable monomer (if present) it is possible to provide compositions which may even expand slightly on being thermoset. Suitable proportions for the liquid saturated polyester have been given above. Suitable proportions by weight of the thermosetting composition for the unsaturated polyester and the copolymerizable monomer are respectively 8 to 30% and 2 to 30%. When styrene is used as copolymerizable monomer, compositions showing minimum shrinkage are generally obtained when the absolute quantity of styrene is in the range 8 to 14% and the absolute quantity of liquid saturated polyester is in the range 3 to 6% by weight of the composition.

The following example illustrates the preparation and properties of compositions according to the present invention. The parts referred to are by weight.

Unsaturated polyester 1 was prepared from:

|  | Molar proportions |
|---|---|
| Propylene glycol | 7.3 |
| Diethylene glycol | 0.5 |
| Phthalic anhydride | 1.0 |
| Isophthalic acid | 1.0 |
| Maleic anhydride | 5.0 | in the usual manner until it had an acid number of 40, and then 200 parts per million of hydroquinone was added. The polyester was then dissolved in monomeric styrene so as to form a 60% by weight solution. The heat distortion temperature of this mixture when thermoset was 117° C.

The dough molding compositions described in the following example were tested in accordance with British Standard Specifications 2782, 1958 and 3840.

EXAMPLE 20 parts by weight of unsaturated polyester 1 solution with 1 part of additional styrene monomer, together with 1 part of benzoyl peroxide paste and 1.7 parts of internal lubricant, were mixed thoroughly with 1.5 parts of finely divided polyethylene (sold under the trade name of Microthene FN500 by USI Chemicals, National Distillers and Chemical Corporation) which has a particle size in the range 8 to 30 microns, 4 parts of polypropylene adipate (manufactured by Imperial Chemical Industries Limited and sold under the trade name of Hexaplas PPA) and 55.8 parts of mineral filler (e.g. Calofil A4 supplied by J & E Sturge). To this paste was added 15 parts of ¼" chopped glass fibers, and the whole mass mixed until all the fibers were dispersed.

This procedure was repeated varying the amounts of polyethylene and Hexaplas in the composition.

On molding, no saturated liquid polyester exuded from the molded compositions during the thermosetting process. Cured moldings were characterized by an outstanding freedom from surface ripple and cracks, internal voids and distortion. A superlative surface gloss was also in evidence.

The results obtained when molded specimens were tested under BS 2782 (1965) 106A shrinkage test are shown in the following table.

| Parts by wt. of Hexaplas | Parts by wt. of polyethylene | Wt. of polyethylene as percent of wt. of Hexaplas | Polyethylene as a percent of total composition | Apparent shrinkage or expansion, thou./in. |
|---|---|---|---|---|
| 1.0 | 1.5 | 150.0 | 1.5 | [1] 1.72 |
| 2.0 | 1.5 | 75.0 | 1.5 | [1] 1.07 |
| 3.0 | 1.5 | 50.0 | 1.5 | [2] 1.17 |
| 4.0 | 0.5 | 12.5 | 0.5 | [2] 1.19 |
| 4.0 | 1.5 | 37.5 | 1.5 | [2] 1.26 |
| 4.0 | 5.0 | 125.0 | 5.0 | [2] 1.32 |
| 4.0 | 10.0 | 250.0 | 10.0 | [2] 1.21 |

[1] Shrinkage.
[2] Expansion.

These results show that over a wide range of concentrations of saturated polyester and thermoplastic, the shrinkage is extremely small and in fact in most cases a small degree of expansion occurs on molding.

The polyethylene is not plasticized by the polypropylene adipate as shown by the following procedure:

Hexaplas PPA (20 grams) was mixed with "Microthene FN 500" (500 grams). The mixture was extruded twice. As a control experiment "Microthene FN 500" was extruded twice without an additive.

The melt flow index of the two compositions was determined according to B.S. 2782, Method 105C, using load A, jet A and a temperature of 190° C.

Melt flow index
grams/10 minutes
Polyethylene+Hexaplas PPA _____ 8.9
Polyethylene alone _____ 9.4

Repetition of these examples using other saturated polyester such as polypropylene sebacate in place of polypropylene adipate gives substantially similar results.

I claim:
1. A fiber reinforced thermosetting molding composition comprising (1) an unsaturated polyester which is a condensation product of a mixture of reactants comprising a glycol and an α-unsaturated dicarboxylic acid, (2) a monomeric material which is copolymerizable with (1), (3) a saturated liquid polyester which is the condensation product of a polyhydric alcohol with a polybasic acid and which has a melting point below 30° C., (4) a minor proportion by weight of a thermoplastic polyolefin, the amount of said thermoplastic polyolefin being at least sufficient to prevent deleterious exudation of said satu- rated polyester during the thermosetting of the molding composition and (5) an inert filler material, (3) being present in a quantity amounting to 1 to 20% by weight of the composition, and (4) being present in a quantity amounting to at least 5% by weight of the saturated polyester up to 20% by weight of the composition.

2. A composition as claimed in claim 1 wherein the saturated polyester is obtained by the inter-esterification of propylene glycol and a dibasic acid selected from the group consisting of adipic and sebacic acids.

3. A composition as claimed in claim 1 wherein the saturated polyester is present in proportions of 3 to 10% by weight of the total composition.

4. A composition as claimed in claim 1 wherein the quantity of thermoplastic polyolefin present is about 5 to 250% by weight of the quantity of saturated polyester.

5. A composition as claimed in claim 1 wherein the thermoplastic polyolefin is polyethylene.

6. A composition as claimed in claim 1 wherein the major proportion of the unsaturated polyester present contains esterified isophthalic acid residues.

7. A composition according to claim 1 wherein the inert filler material is present in an amount of at least 50% by weight of the composition.

8. A composition according to claim 1 wherein the thermoplastic polyolefin is polypropylene.

References Cited

UNITED STATES PATENTS

| 2,567,719 | 9/1951 | Loritsch et al. | 260—31.8 |
| 3,256,362 | 6/1966 | Craubner et al. | 260—862 |
| 3,489,707 | 1/1970 | Fry | 260—31.6 |

FOREIGN PATENTS

| 1,098,132 | 1/1968 | Great Britain. |

WILLIAM H. SHORT, Primary Examiner

E. A. NIELSEN, Assistant Examiner

U.S. Cl. X.R.

260—862